United States Patent
Lotspeich

[11] 3,892,469
[45] July 1, 1975

[54] ELECTRO-OPTICAL VARIABLE FOCAL LENGTH LENS USING OPTICAL RING POLARIZER

[75] Inventor: James F. Lotspeich, Malibu, Calif.

[73] Assignee: Hughes Aircraft Company, Culver City, Calif.

[22] Filed: Feb. 1, 1974

[21] Appl. No.: 438,900

[52] U.S. Cl............. 350/150; 350/175 DR; 350/157
[51] Int. Cl. ................................................ G02f 1/26
[58] Field of Search .............. 350/150, 157, 175 DR

[56] References Cited
UNITED STATES PATENTS

| | | | |
|---|---|---|---|
| 3,424,513 | 1/1969 | Lotspeich | 350/175 DR X |
| 3,702,214 | 11/1972 | Segre | 350/150 |

*Primary Examiner*—John K. Corbin
*Attorney, Agent, or Firm*—W. H. MacAllister, Jr.; Donald C. Keaveney

[57] ABSTRACT

There is disclosed an electrically controlled, variable focal length lens made of crystalline material possessing $3m$ symmetry in an electric field which is particularly adapted to affect the direction of propagation of ring-polarized light, a means positioned ahead of the lens for converting linearly-polarized light into ring-polarized light, and a means positioned behind the lens for converting ring-polarized light into linearly-polarized light. The arrangement may, for example, be used as a voltage controlled device for variably controlling the divergence of a laser beam.

11 Claims, 9 Drawing Figures

ELECTRO-OPTICAL VARIABLE FOCAL LENGTH LENS USING OPTICAL RING POLARIZER

BACKGROUND OF THE INVENTION

For best projection of laser light through space, the laser light is preferably linearly polarized. Typically, laser beams are substantially non-divergent. When used for communication, the laser beam is difficult to acquire because of such non-divergence. For example, in transmitting from point A to point B, the laser beam might miss point B entirely.

The distribution of light flux across a laser beam is substantially Gaussian. To facilitate the acquisition of a laser beam, it is desirable to cause the laser beam to diverge during the acquisition, while maintaining the Gaussian distribution. For example, in channeling a laser beam from point A to point B, one should diverge the laser beam so that, even with a small misalignment, the laser beam is detected at point B. The laser may then be moved angularly to cause the signal at point B to be maximized. By maintaining the Gaussian distribution, the maximizing of the signal at point B when the laser beam is divergent causes the laser beam to be aligned precisely between points A and B. The laser beam is then returned to minimum divergence status.

One prior means for controlling the divergence of a laser beam is that shown in my U.S. Pat. No. 3,424,513, which was issued Jan. 28, 1969 to J. F. Lotspeich for an "Electro-Optic Variable Focal Length Lens" and which is assigned to Hughes Aircraft Company, the assignee of this application. The apparatus of that patent used a liquid medium for each of two tandem lenses. Unfortunately, the liquids which are used have a tendency to be toxic to human beings. The device is hard to build and the focal lengths of the lens system for two perpendicular directions of polarization are not exactly equal, which introduces astigmatic distortion error. The present invention is an improvement over that device and eliminates these problems.

SUMMARY OF THE INVENTION

The lens of this invention uses an array of six parallel, cylindrical electrodes embedded in a single solid body of crystalline material possessing $3m$ ($C_{3v}$) symmetry and having a linear electro-optic characteristic such that, when viewed in cross section, the electrode centers lie at the corners of a regular hexagon. Adjacent electrodes are oppositely charged positive and negative from a source of variable DC high voltage. The crystallographic Z axis (or optic axis) is oriented parallel to the direction of the cylindrical electrode array, and the positive direction of the crystallographic Y-axis through the center of the electrode array points to the center of a negative electrode. With such orientation of the crystal, the resulting electric field produces at every internal point a birefringence proportional only to the square of the radial distance from the center of the lens, and the "slow" axis is everywhere tangent to its circle of constant birefringence. The natural (unperturbed) indices of refraction of such crystals are isotropic, at least for polarization in all directions perpendicular to the optical axis of the lens.

The lens preferably operates upon ring-polarized light. Typical laser light is linearly polarized. It is thus preferred to convert the linearly-polarized laser light into ring-polarized light, prior to entry of the light into the lens. After leaving the lens, the ring-polarized light is preferably changed back to linearly-polarized light, because linearly-polarized light is transmitted with maximum axial intensity. It should be stressed, however, that it is not necessary for the ring-polarized light to be changed back to linearly-polarized light for the apparatus to come within the spirit and scope of this invention.

One means to convert linearly-polarized light into ring-polarized light and ring-polarized light into linearly-polarized light comprises a novel polarization converter which forms the subject matter of my copending application Ser. No. 438,899 filed concurrently herewith and entitled "Optical Device For Transforming Monochromatic Linearly Polarized Light To Ring Polarized Light," which is assigned to the same assignee as the present application. In that device a disc of birefringent material followed by an ordinary quarter wave plate is used. One face of the disc is flat, and the other face is cut so that the disc thickness $b$ varies linearly, through a range of $2\pi$ radians as a function of the angle from a radial line, at 0 radians, between $b_o$ and $b_o + 2\lambda/(n_e - n_o)$, where the difference between the extraordinary index of refraction ($n_e$) and the ordinary index of refraction ($n_o$) is called the birefringence of the crystal and where $\lambda$ is the transmitted radiation wavelength. In practice it would be mechanically impossible to generate such a surface if it included the center of the disc. Therefore, a small center hole is cut in the disc and filled with an opaque plug.

It is an object of this invention to vary the divergence of a laser beam responsively to a characteristic of an electric voltage.

It is a more specific object of the invention to vary the focal length of a crystalline lens by using electro-optical techniques.

It is still a more specific object of this invention to vary the focal length of a crystalline lens by using a variable electric field having a configuration which will act on ring-polarized light and to convert linearly-polarized light into ring-polarized light to be acted on.

It is a further object of this invention to provide apparatus for achieving the above-enumerated objects.

BRIEF DESCRIPTION OF THE FIGURES

Other objects will become apparent from the following description, taken in connection with the accompanying drawings in which.

DETAILED DESCRIPTION OF THE INVENTION

Figure 1:
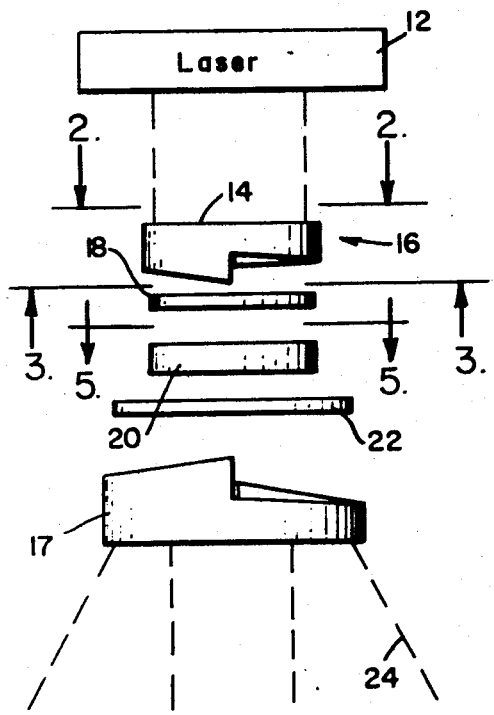
FIG. 1 is a side view of the polarizer and lens elements of the invention.

In the Figures, a substantially non-diverging monochromatic light beam is emitted from a laser 12 onto the flat surface 14 of a specially shaped disc 16 of birefringent material followed by a quarter wave plate 18, thence through an electro-optical crystalline lens 20, a quarter wave plate 22, and a specially fabricated disc 17. The lens 20 and the discs 16 and 17, together with the quarter wave plates 18 and 22, are the subject of this invention. Discs 16 and 17 may be oriented as shown or they may be reversed front to back.

The discs 16 and 17 are shown in detail in FIGS. 1, 2, 3, 4a, and 4b and are described and claimed per se in my above copending application. The discs 16 and 17 are substantially identical, except that the disc 17 may need to be larger than the disc 16 to accommodate the diverging rays 24. The surface 14 is a substantially Any birefringent plate of thickness $b$ whose fast and slow axes are oriented at plus and minus 45° relative to the electric vector E of an incident plane polarized beam produces a relative phase shift $\Gamma = 2\pi b (n_e - n_o)/\lambda$ between the principal beam components, resulting in elliptical polarization. A quarter wave plate whose fast or slow axis is parallel to the original polarization reproduces a locally plane polarized beam rotated at an angle $\Gamma/2$ from its original direction.

We show this with the Jones calculus, using an incident vertically-polarized beam.

$$\begin{pmatrix} E_x \\ E_y \end{pmatrix} = \begin{pmatrix} e^{-j\pi/4} & 0 \\ 0 & e^{+j\pi/4} \end{pmatrix} \begin{pmatrix} \frac{1}{\sqrt{2}} & -\frac{1}{\sqrt{2}} \\ \frac{1}{\sqrt{2}} & \frac{1}{\sqrt{2}} \end{pmatrix} \begin{pmatrix} e^{+j\Gamma/2} & 0 \\ 0 & e^{-j\Gamma/2} \end{pmatrix} \begin{pmatrix} \frac{1}{\sqrt{2}} & \frac{1}{\sqrt{2}} \\ -\frac{1}{\sqrt{2}} & \frac{1}{\sqrt{2}} \end{pmatrix} \begin{pmatrix} 0 \\ 1 \end{pmatrix}$$

Figure 2:
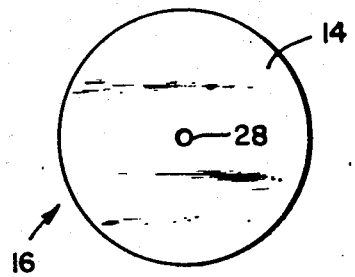
FIG. 2 is a view of disc 16, taken at 2—2 in FIG. 1.
Figure 3:
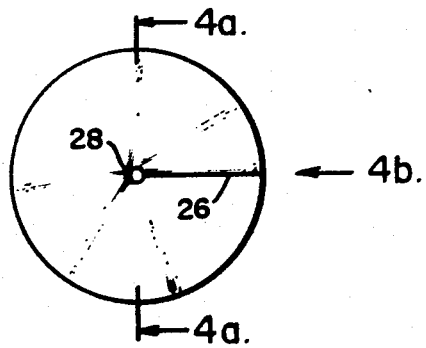
FIG. 3 is a view of disc 16 taken at 3—3 in FIG. 1.
Figure 4B:
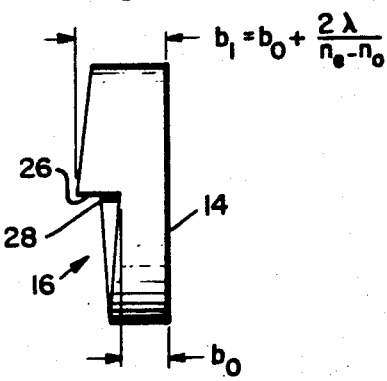
FIG. 4b is an edge elevation view of the disc of FIG. 3 taken in the direction of the arrow 4b therein.
Figure 4A:
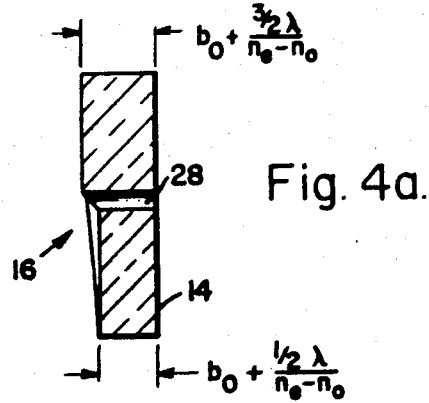
FIG. 4a is a sectional view taken at 4a—4a in FIG. 3.

$\frac{\lambda}{4}$ plate    birefringent plate oriented at 45°    incident electric vector $$= \begin{pmatrix} e^{-j\pi/4} & 0 \\ 0 & e^{+j\pi/4} \end{pmatrix} \begin{pmatrix} \cos\frac{\Gamma}{2} & -j\sin\frac{\Gamma}{2} \\ j\sin\frac{\Gamma}{2} & \cos\frac{\Gamma}{2} \end{pmatrix} \begin{pmatrix} 0 \\ 1 \end{pmatrix}$$

$$= \begin{pmatrix} e^{-j\pi/4}\cos\frac{\Gamma}{2} & -je^{-j\pi/4}\sin\frac{\Gamma}{2} \\ je^{+j\pi/4}\sin\frac{\Gamma}{2} & e^{+j\pi/4}\cos\frac{\Gamma}{2} \end{pmatrix} \begin{pmatrix} 0 \\ 1 \end{pmatrix} = \begin{pmatrix} e^{+j\pi/4}\sin\frac{\Gamma}{2} \\ e^{+j\pi/4}\cos\frac{\Gamma}{2} \end{pmatrix}$$ Q.E.D.

flat surface. The thickness of the discs varies linearly with angle from a radial line 26, between a thickness $b_o$ on the thin side of the line and $b_1$ wherein $b_1 = b_o + 2\lambda/(n_e - n_o)$ on the thick side of the line. The quantity $n_e$ is the extraordinary index of refraction of the crystalline material of which the disc 16 is comprised, and $n_o$ is the ordinary index of refraction of the crystalline material of which the disc 16 is comprised. FIG. 2 is a plan view of the flat surface of the disc 16 and FIG. 3 is a plan view of the ramp side of the disc. FIG. 4a is a central sectional view of disc 16 taken in the direction of the arrows 4a and FIG. 4b is an edge elevation of disc 16 taken in the direction of arrow 4b. It is mechanically impossible to include the center in such a shape. Consequently a small hole is drilled through the center and filled with an opaque plug 28. The disc itself is formed of a birefringent material.

Reference is made to chapter 14 "Optics of Crystals" of *Principles of Optics*, by Max Born and Emil Wolf, 4th Edition, 1970, published by Pergamon Press for general background theory which is herein assumed. Attention is particularly directed to the discussion in Section 14.3.2 "Light Propagation in Uniaxial Crystals." The construction and operation of a quarter wave plate is described in Section 14.4.2 "Compensators." The quantity $n_e - n_o$ is the birefringence of the crystal.

Now if the thickness of the device varies in such a way that $$\Gamma/2 = \phi + 2N\pi$$

where $N$ = any integer and where $\phi$ is the clockwise angular position measured from the radial ridge line, then the emerging beam will have components $E_x = \sin\phi$
$E_y = \cos\phi$ which characterize the ring polarization required (neglecting the unimportant common phase factor $e^{+j\pi/4}$). The explicit angular dependence of the thickness $b$ then becomes $$b = \frac{\Gamma\lambda}{2\pi(n_e-n_o)} = \frac{\lambda}{\pi(n_e-n_o)}(\phi + 2N\pi)$$

and $$b_o = \frac{2N\lambda}{n_e-n_o}$$

When $\phi$ increases from zero to $2\pi$, $b = b_o + \frac{2\lambda}{n_e-n_o}$

In order to prevent refraction due to the sloping surface, the disc should either be covered with a mating piece of homogeneous index matching material ($n \cong 1/2(n_e+n_o)$), such that the composite structure presents two parallel surfaces to the beam, or it should be immersed in an indexmatching fluid within a cell having parallel end windows.

Figure 5:
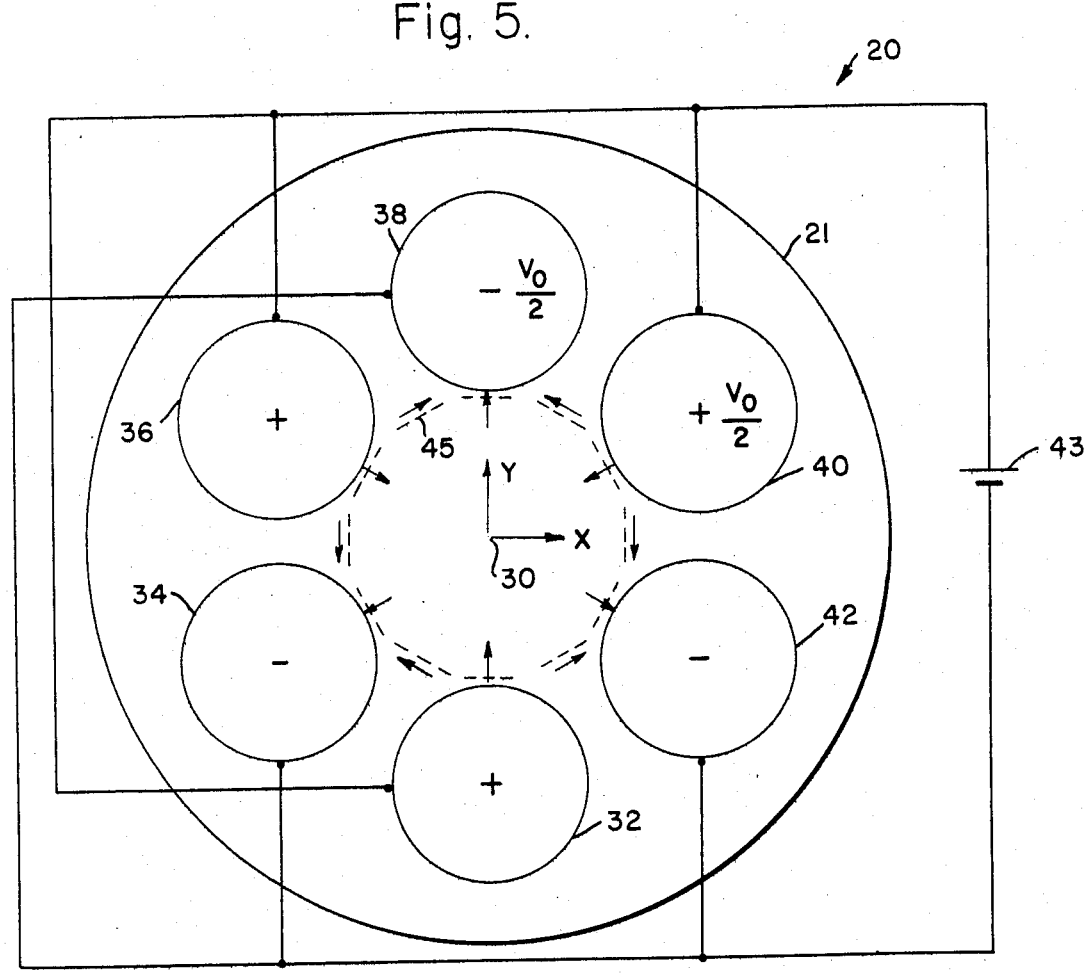
FIG. 5 is a partly schematic view taken at 5—5 in FIG. 1 showing the electrode array.

The electro-optical crystalline lens 20 shown in diagrammatic cross section in FIG. 5 consists of an array of six parallel cylindrical electrodes 32, 34, 36, 38, 40, and 42 embedded in a right cylinder 21 of crystalline material possessing $3m$ ($C_{3v}$) symmetry and having a linear electro-optic effect. The threefold axis of rotational symmetry of the crystal is oriented parallel to the central axis 30. The rod electrodes are parallel to the axis 30 and are evenly spaced at the same radial distance from it such that, when viewed in cross section, their centers lie at the corners of a regular hexagon having its center of symmetry at the axis 30. The electrodes are charged alternately positive and negative from a source 43 of high unidirectional voltage. The positive direction of the crystalline Y-axis through the center of the electrode array points to the center of a negatively charged electrode such as electrode 38. The X-axis is orthogonal to the Y-axis and is in the same plane and the Z-axis is orthogonal to the X–Y plane of the paper in FIG. 5. As will be shown later under the heading "Theory of Operation," this orientation produces at every internal point a birefringence which is proportional only to the square of the radial distance from the system central axis 30. Further, the "slow" axis is everywhere tangent to its circle of constant birefringence, 45.

Figure 6:
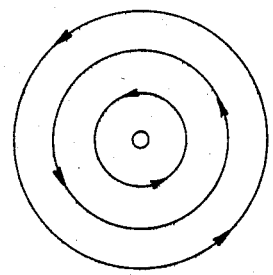
FIG. 6 is a diagram of a ring-polarized electric field.

Since the slow axes of the device lie on concentric circles, the electric vector of an incident polarized laser beam on which the device is to act must be similarly directed. That is to say, a laser beam passing axially through the electro-optical lens 20 will emerge conically divergent if the incident beam is "ring-polarized" as in a cylindrical $TE_{01}$ mode, or, more particularly, as illustrated in the diagram of a ring-polarized electric field shown in FIG. 6.

Plane-polarized light from laser 12 is converted to ring-polarized light by the polarization converter comprising the birefringent disc 16 and the quarter-wave plate 18 through which the light is transmitted to the electro-optical crystalline lens 20 as shown in FIG. 1. The ring-polarized light from lens 20, which is conically divergent to a degree which will be more explicitly stated below and which is a function of the voltage applied to the electrodes, is passed through the quarter-wave plate 22 and birefringent disc 17 which comprises a polarization converter operating in the opposite mode to convert the ring-polarized light to plane-polarized light. Since the amount of the conical divergence of the light exiting from disc 17 depends upon the magnitude of the voltage applied to the electrodes in lens 20, the assembled device permits fast and continuous electrical control of the collimation and decollimation of a laser beam in laser radar or laser communication systems applications.

THEORY OF OPERATION

Referred to a two-dimensional coordinate system coincident with the crystalline X, Y axes, the potential in the interior region of the hexapole array is approximated by the Schwartz transformation $$V = \frac{V_o}{2\rho_m^3} Im(x+jy)^3 = \frac{V_o}{2\rho_m^3}(3x^2y - y^3)$$

where $\rho_m$ is the radius of the inscribed circle touching each electrode. The electric field components, given also in cylindrical coordinates $\rho, \gamma$, are $$E_x'' = -\frac{\delta V}{\delta x} = -\frac{3V_o}{2\rho_m^3}(2xy) = -\frac{3V_o}{2\rho_m^3}\rho^2 \sin 2\phi$$

$$E_y'' = -\frac{\delta V}{\delta y} = -\frac{3V_o}{2\rho_m^3}(x^2-y^2) = -\frac{3V_o}{2\rho_m^3}\rho^2 \cos 2\phi$$

The X–Y central section of the index ellipsoid for an electro-optic crystal with applied electric field of arbitrary direction in that plane is given by the equation:

$$B_1 x^2 + B_2 y^2 + 2 B_6 xy = 1$$

where the impermeability tensor components $B_i( = 1/n_i^2)$ for a crystal of $3m$ symmetry are $B_1 = B_o - r_{22}E_y$
$B_2 = -B_o + r_{22}E_y$
$B_6 = -r_{22}E_x$ In the principal axis system $X', Y'$, oriented at an angle $\beta$ with respect to the original crystal axes, the index ellipse is $$B_1' x'^2 + B_2' y'^2 = 1$$

where
$B_1' = \frac{1}{2}[B_1 + B_2 - \sqrt{(B_1 - B_2)^2 + 4 B_6^2}]$
$= B_o - r_{22}E$
$B_2' = \frac{1}{2}[B_1 + B_2 + \sqrt{(B_1 - B_2)^2 + 4 B_6^2}]$
$= B_o + r_{22}E$
$(E = \sqrt{E_x^2 + E_y^2})$ and $\tan 2\beta = \dfrac{2B_6}{B_1 - B_2} = \dfrac{-2r_{22}E_x}{-2r_{22}E_y} = \dfrac{E_x}{E_y}$ Now within the electrode array the ratio of the field component is $$\frac{E_x^e}{E_y^e} = \tan 2\beta$$

Therefore,
$2\beta = 2\phi \pm N\pi$ ($N$ any integer)
or $$\beta = \phi \pm \frac{N\pi}{2}$$

But when $E_x = 0, E_y > 0$, then $\beta = 0$ (or $\pi$), and $B_1' = B_1 = B_o - r_{22}E$ where $E = E_y$
and $\gamma = \pm \pi/2$, and the $x$ axis is the slow axis. Thus $N = 1$ and $\beta = \gamma \pm \pi/2$;
that is, the slow axis is everywhere pependicular to the position vector $\vec{\rho}$. Thus, it is tangent to a circle about the origin. The explicit dependence of the slow index $n_s$ on the field strength $E$ and ultimately on the radius $\rho$ and voltage $V_o$ becomes $$n_s = n_o + \frac{1}{2}n_o^3 r_{22}E = n_o + \frac{3n_o^3 r_{22} V_o}{4\rho_m^3}\rho^2$$

FIG. 5 shows a cross-sectional view of the rod electrode array, the voltage polarities, the coordinate axes, the electric field directions at chosen points within the array and the corresponding directions of the slow axis 45 (dashed lines).

We assume a laser beam, ring-polarized, entering the array at its center and traveling parallel to the Z-axis. By symmetry, we may examine a ray path in, say, the X-Z plane. The equations of motion of a ray trajectory in a region of transverse index gradient have been previously developed (U.S. Pat. No. 3,424,513). When X is the radial coordinate and $\theta$ is the angle which the ray makes with the Z-axis, the equations are $$\frac{d^2x}{dz^2} = \frac{1}{n}\frac{dn}{dx} = \frac{1}{n_o}\frac{dn_x}{dx}; \quad \theta = \frac{dx}{dz}$$

If the initial values are $x = x_o$, $\theta = 0$, and with $$\frac{1}{n_o}\frac{dn_x}{dx} = \left(\frac{3 n_o^2 r_{22} V_o}{2\rho_m{}^3}\right) x = K_n{}^2 x$$

the solutions are:
$x = x_o \cosh K_n z$
$\theta = K_n x_o \sinh K_n z$
Upon emerging into air after traversing a length $L$, the ray has an angle
$\alpha(L) = n_o \theta(L) = n_o K_n x_o \sinh K_n L$
and a position
$x(L) = x_o \cosh K_n L$
The point on the Z-axis from which the ray appears to emerge is located a distance $$f = \frac{x(L)}{\alpha(L)} = \frac{\coth K_n L}{n_o K_n}$$

behind the exit point. Since it is independent of $x_o$ it is a true focal point of a voltage-variable negative lens.

Figure 8:
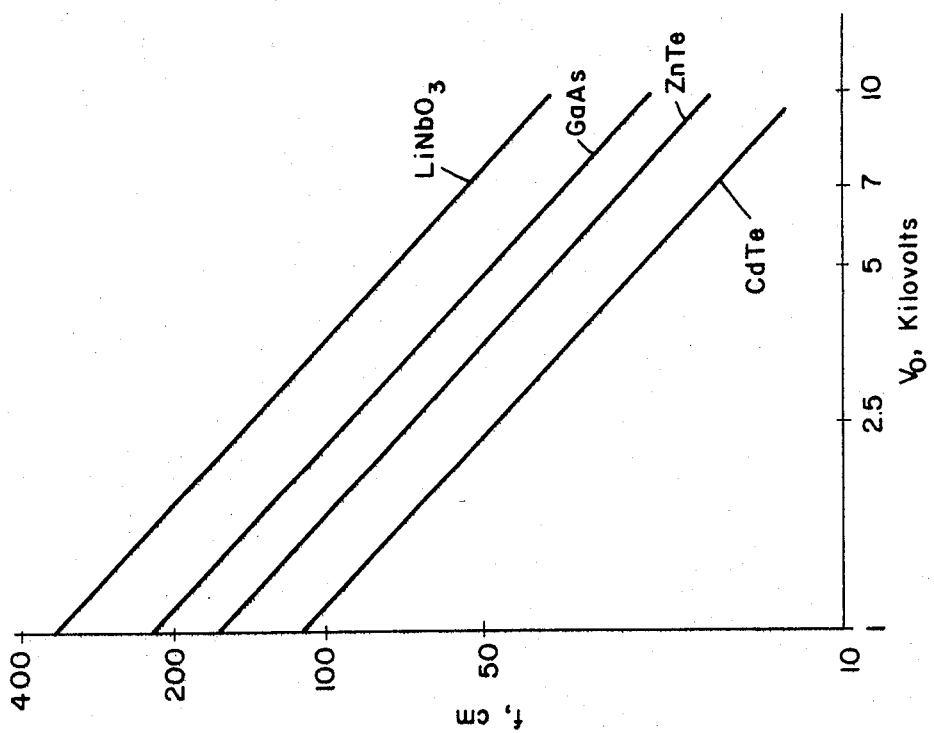
FIGS. 7 and 8 are graphs of lens characteristic for four typical materials.
Figure 7:
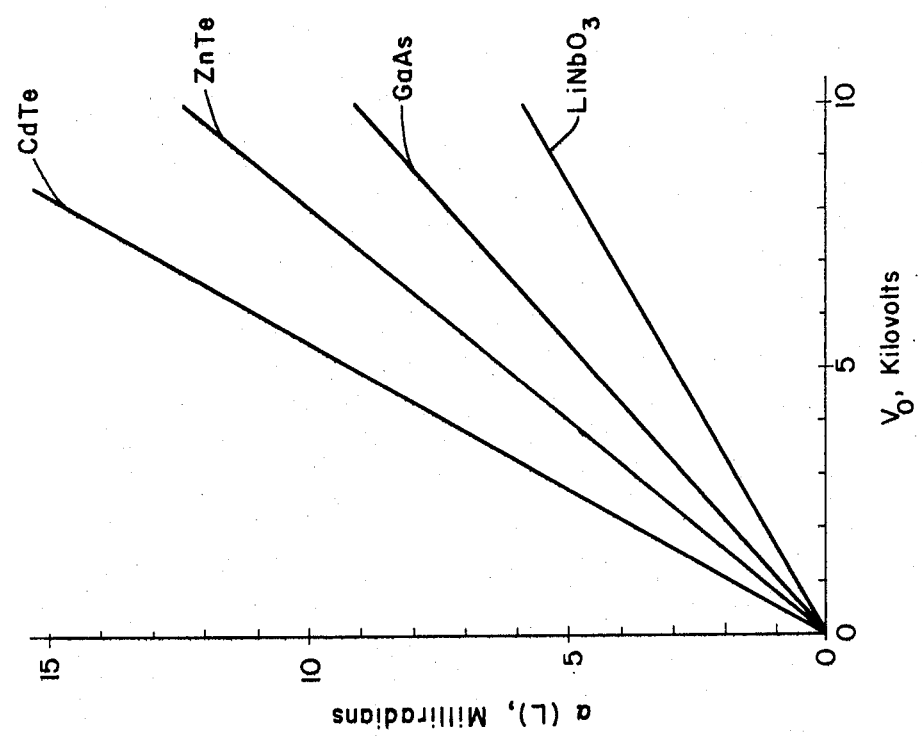

The curves of FIGS. 7 and 8 respectively plot $\alpha(L)$ and $f$ as a function of voltage when $L = 10$ cm, $\rho_m = .25$ cm, $x_o = .20$ cm for four materials: LiNbO$_3$, GaAs, ZnTe and CdTe. The latter three belong to crystal class $\overline{4}3m$ but have the required $3m$ symmetry when the Z-axis is [111].

Because of the unorthodox beam polarization character required by the electro-optic lens just described, we need to examine the far field diffraction pattern of this "ring-polarized" beam. It is intuitively obvious that the far field pattern will have a null at the center, since every element of the beam at its source will cancel a corresponding element of opposite polarity symmetrically located across the beam axis (assuming that the beam intensity profile is cylindrically symmetric, e.g., Gaussian).

To calculate the diffraction pattern, we assume a laser beam emanating in the positive $Z$ direction from a source distant $-Z_o$, below the coordinate origin. In the $X'-Y'$ plane of the source, a ring-polarized Gaussian beam is assumed, where the field amplitudes are represented by $E_x' = \sin \phi' e^{-\rho'^2/2a^2} e^{jk z_o}$
$E_y' = \cos \phi' e^{-\rho'^2/2a^2} e^{jk z_o}$ where $\rho'$, $\gamma'$ are cylindrical coordinates, $a$ is the e-folding radius of the beam intensity profile, and $k = 2\pi/\lambda$. At a point in the X-Y plane at Z = 0, the Kirchhoff formula gives the field amplitude vector, for $Z_o \gg a$, as $$\vec{E} = \frac{jk}{2\pi z_o} \int_{S'} \vec{E} e^{-jkr} dS'$$

where $S'$ is the area of integration over the source and $r$ is the distance from the source element of integration to the point of interest, where $E$ is evaluated. Because of obvious cylindrical symmetry, we can choose this point on the X axis at $\rho = \rho$, $\gamma = o$ where $E$ has only a Y component. Thus, $$E_y = \frac{jk}{2\pi z_o} \int_{S'} E_y' e^{-jkr} dS$$
$$= \frac{jk}{2\pi z_o} \int_{S'} \cos \phi' e^{-\frac{\rho'^2}{2a^2}} e^{-jk(r-z_o)} dS'$$

Now
$r = [z_o^2 + \rho^2 + \rho'^2 - 2\rho\rho' \cos \phi']^{1/2}$
$\cong z_o \left[1 + \frac{1}{2z_o^2}(\rho^2 + \rho'^2 - 2\rho\rho' \cos \phi')\right] \quad \rho,\rho' \ll z$
$r - z_o = \frac{1}{2z_o}(\rho^2 + \rho'^2 - 2\rho\rho' \cos \phi')$ Therefore $$E_y = \frac{jk}{2\pi z_o} \int_0^\infty \int_{-\pi}^\pi e^{\rho'^2/2a^2} e^{-jk/2z_o(\rho^2+\rho'^2)} e^{jk\rho\rho'/z_o \cos \varphi'}$$

$$= \frac{jk}{2\pi z_o} e^{-jk\rho^2/2z_o} \int_0^\infty e^{-\rho'^2/2a^2(1+jka^2/z_o)}$$

$$\left\{\int_{-\pi}^\pi e^{jk\rho\rho' \cos \rho'/-z_o} \cos \varphi' dW \right\} \rho' d\rho'$$

If $k a^2 \ll z_o$ (condition for far field), then $$|E_y| = \frac{k}{z_o} \int_0^\infty e^{\rho'^2/2a^2} J_1\left(\frac{k\rho\rho'}{z_o}\right) \rho' d\rho'$$

Evaluation of the integral leads to $$|E_y| = \sqrt{\frac{\pi}{2}} \frac{v_o v}{2} e^{-v^2/2} F\left(\frac{1}{2}, 2; \frac{v^2}{2}\right)$$

where $v \quad \frac{k a \rho}{z_o}$ $v_a \quad \frac{k a^2}{z_o}$ and $F\left(\frac{1}{2}, 2; \frac{v^2}{2}\right)$ = confluent hypergeometric function.

The corresponding intensity is $$I_y = \frac{1}{2} G_o |E_y|^2 \quad (G_o = \frac{1}{Z_o} = \frac{1}{377} mho)$$

$$= \frac{\pi}{16} G_o v_a^2 v^2 e^{-v^2} \left[F\left(\frac{1}{2}, 2; \frac{v^2}{2}\right)\right]^2$$

The radial intensity distribution is $$I = \frac{\pi}{8} v^2 e^{-v^2} \left[ F\left(\frac{1}{2}, 2; \frac{v^2}{2}\right) \right]^2$$

where we have set $$\tfrac{1}{2} G_o v_o^2 = 1$$

It is to be noted that this far-field intensity distribution is zero on axis. The corresponding diffraction pattern intensity distribution for a linearly-polarized Gaussian source of the same $e$-folding radius and power is $$I_1 = e^{-v^2}$$

which remains Gaussian in the far field. It is thus desirable to use disc 20 and quarter wave plate 22 to reconvert the ring polarized light to linearly-polarized light for propagation.

What is claimed:

1. An electrically controlled variable focal length lens system for controlling the divergence of polarized light such as the output of a laser, said lens system comprising:
   a. a solid body of crystalline material having a plurality of electrodes embedded therein, said electrodes being positioned in said crystal to produce at every internal point therein a birefringence proportional only to the square of the radial distance from the center of the lens to the given point, the slow axis of said crystal being everywhere tangent to its circle of consant refringence, said electrically controlled crystal thereby being adapted to affect ring-polarized light;
   b. means positioned ahead of said lens for receiving linearly-polarized light and for converting said light into ring-polarized light; and
   c. means to apply control voltages to said electrodes.

2. Apparatus as in claim 1 and further including:
   a. means positioned behind said lens for receiving ring-polarized light from said lens and for converting said ring-polarized light into linearly polarized light.

3. Apparatus as in claim 1 wherein said solid body has a cylindrical shape and said electrodes are rod shaped and are positioned therein so that when said solid body is viewed in cross section said electrodes lie at the corners of a regular polygon.

4. Apparatus as in claim 3 wherein adjacent electrodes are held at opposite polarities by said control voltages.

5. Apparatus as in claim 3 wherein said regular polygon is a hexagon and there are six of said electrodes, one at each corner of said hexagon.

6. Apparatus as in claim 1 wherein said solid body of crystalline material has $3m(C_{3v})$ symmetry.

7. An electrically controlled variable focal length lens system for controlling the divergence of polarized light such as the output of a laser, said lens system comprising:
   a. a solid body of crystalline material having a plurality of electrodes embedded therein, said electrodes being positioned in said crystal to produce at every internal point therein a birefringence proportional only to the square of the radial distance from the center of the lens to the given point, the slow axis of said crystal being everywhere tangent to its circle of constant refringence, said electrically controlled crystal thereby being adapted to affect ring-polarized light;
   b. means positioned ahead of said lens for receiving linearly-polarized light and for converting said light into ring-polarized light, said means comprising a plano-ramp shaped disc of birefringent material having a thickness which varies linearly through $2\pi$ radians as a function of angle from an initial radial line from a minimum value at zero radians to a maximum value equal to said minimum value plus the quotient of twice the design wavelength divided by the birefringence of the material of the disc, said design wavelength being the wavelength of the radiation to be transmitted through the disc, and said disc being followed by a quarter wave plate;
   c. means positioned behind said lens for receiving ring-polarized light from said lens and for converting said ring-polarized light into linearly polarized light, said means comprising a quarter wave plate followed by a plano-ramp shaped disc of birefringent material having a thickness which varies linearly through $2\pi$ radians as a function of angle from an initial radial line from a minimum value at zero radians to a maximum value equal to said minimum value plus the quotient of twice the design wavelength divided by the birefringence of the material of the disc, said design wavelength being the wavelength of the radiation to be transmitted through the disc and
   d. means to apply control voltages to said electrodes.

8. Apparatus as in claim 7 wherein said solid body has a cylindrical shape and said electrodes are rod shaped and are positioned therein so that when said solid body is viewed in cross section said electrodes lie at the corner of a regular polygon.

9. Apparatus as in claim 8 wherein said solid body of crystalline material has $3m(C_{3v})$ symmetry.

10. Apparatus as in claim 9 wherein adjacent electrodes are held at opposite polarities by said control voltages.

11. Apparatus as in claim 10 wherein said regular polygon is a hexagon and there are six of said electrodes, one at each corner of said hexagon.

* * * * *